April 15, 1952  F. B. BAYLESS  2,593,000
HYDRAULIC TORQUE INDICATOR
Filed Jan. 2, 1948  2 SHEETS—SHEET 1

INVENTOR.
F. B. BAYLESS
BY
ATTORNEYS

Patented Apr. 15, 1952

2,593,000

UNITED STATES PATENT OFFICE 2,593,000

HYDRAULIC TORQUE INDICATOR

Frederick B. Bayless, Midland, Tex., assignor to Phillips Petroleum Company, a corporation of Delaware Application January 2, 1948, Serial No. 302

8 Claims. (Cl. 73—136)

This invention relates to a torque indicator. In one embodiment, it relates to apparatus for measuring torque applied to the rotary table or the like on rotary drilling rigs.

In the drilling of oil wells with rotary rigs, and in particular the drilling of deep oil wells, the drill pipe, in drilling the different strata is subjected to considerable stress. This stress is imposed first by the weight of the drill string and, secondly, by the resistance of the strata to the rotating of the drill pipe and to the cutting by the drill bit. If care is not taken to control the amount of torque imposed on this drill string, twist-offs may easily occur which will result in expensive fishing jobs. Where the motive power of the drilling rig is an electric motor, the amount of current passing to the motor can be easily measured and the amount of torque being applied to the drill string easily ascertained from this measurement. However, in the use of diesel or gasoline engines, and the like, as the motive power, conditions change so rapidly that measurement of the horsepower being delivered by the engine, and hence measurement of torque to the drill string has been very difficult and inaccurate. In order to enable the driller to measure torque in instances where the drilling rig is powered by gasoline or diesel engines, or even by an electric motor, I have devised a torque indicator in which I have placed a fluid medium between the driver and the driven member, whereby the pressure on said fluid will be a function of the torque applied. The driller, in noting the pressure gage which may be calibrated in pounds-torque, will instantly know the amount of torque being applied, and hence can adjust the feed of the drill string, thereby controlling the amount of torque applied to the drill string.

One object of my invention is to provide a hydraulic torque indicator.

Another object is to provide a torque indicator that may be easily constructed, efficient in its operation and which requires a minimum amount of maintenance.

Still another object is to provide a hydraulic torque indicator for use on rotary drilling rigs.

Other objects and advantages of my invention will be obvious to one skilled in the art from the accompanying disclosure and discussion.

Figure 1:
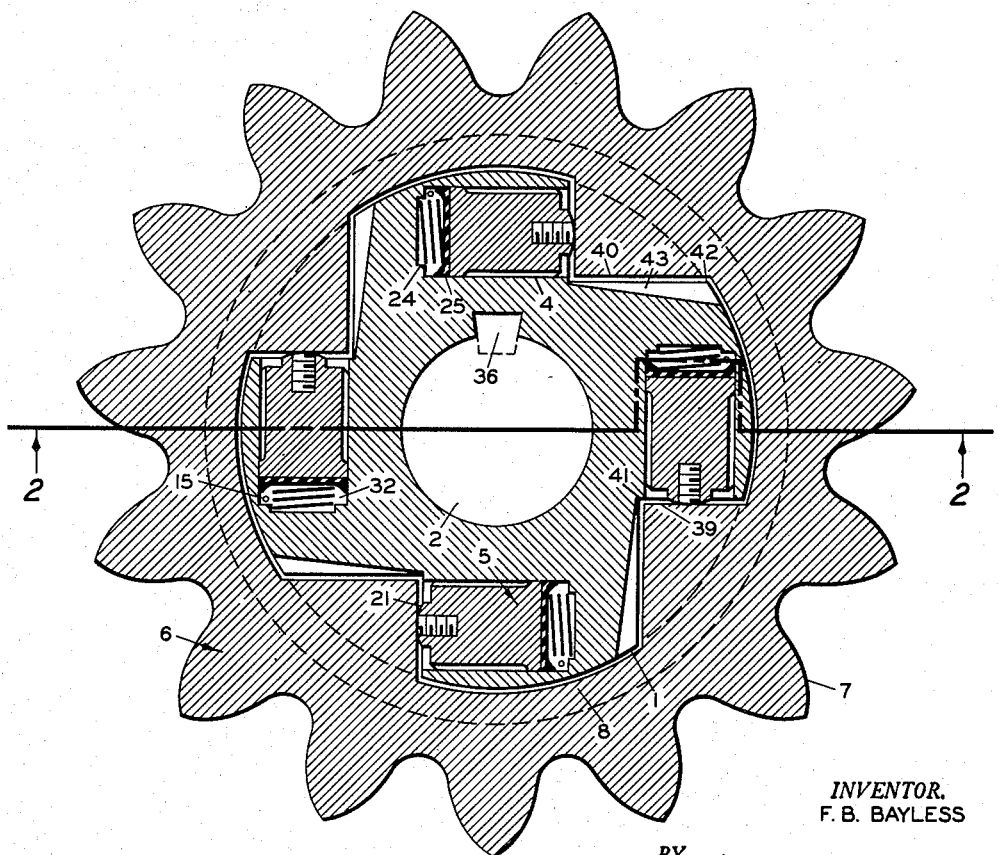
Figure 1 is a sectional plan view of the assembly of the hydraulic torque indicator taken at line 1—1 of Figure 2.
Figure 2:
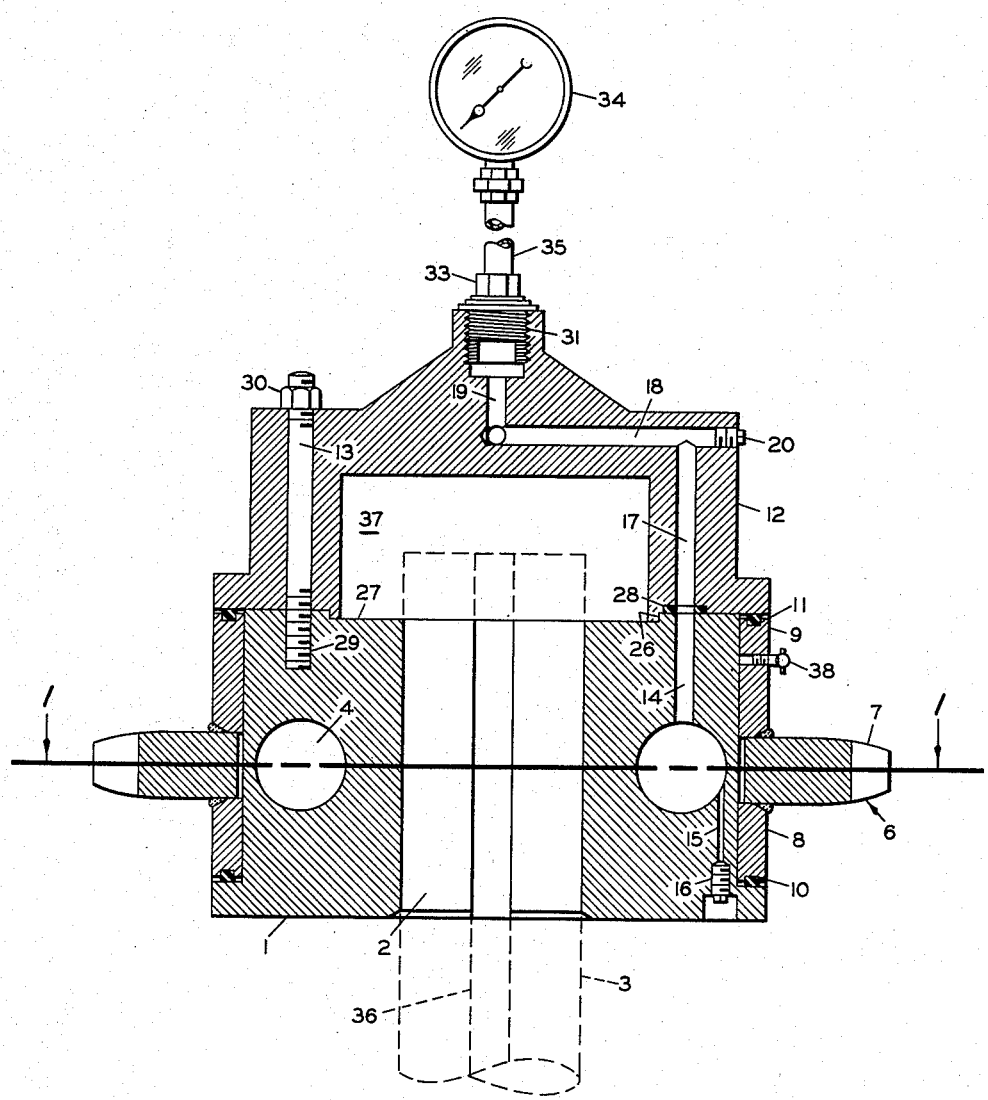
Figure 2 is a sectional elevation view of the assembly of the hydraulic torque indicator taken at line 2—2 of Figure 1, with the pistons omitted.

With reference to Figures 1 and 2 of the drawing, numeral 1 represents the cylinder head of the torque indicator. Cylinder head 1 is traversed by an opening 2 which is made to fit shaft 3. The base of cylinder head 1 is circular, but the upper portion is formed into a cross-like shape with each cross arm having two parallel flat faces 41 and 42. The flat face 41 of each cross arm contains a cylinder or cylindrical recess 4 which accommodates the corresponding piston 5, flexible, resilient piston cup 25 and spring 24. It is understood that the number of cylindrical recesses 4 and pistons 5 and associated parts will depend upon the service to which this hydraulic indicator will be subjected. I prefer to use four as shown in my illustration. Surrounding cylinder head 1 is a driver assembly 6, which consists of a sprocket 7, spacer rings 8 and 9, and cylindrical packings 10 and 11. Spacer rings 8 and 9 may be attached to sprocket 7 by any suitable means, but I prefer to have them welded to sprocket 7, as shown in Figure 2. The inside surface of sprocket 7 has been machined to a cross-like shape with each portion of the cross having parallel flat faces 39 and 40. The flat face 42 of cylinder head 1 has an angular recessed portion 43, the width of said recessed portion 43 being slightly larger than the thickness of sprocket 7. The purpose of this recess is to allow play between the flat face 42 on cylinder head 1 and the flat face 40 on sprocket 7. This positively insures that there will be a fluid medium between the driver assembly 6 and the driven means (cylinder head 1). The only point of contact between the cylinder head 1 and the driver assembly 6 is thru flat face 39 on sprocket 7 and raised portion 21 on piston 5. Pressure head 12 is fastened to cylinder head 1 by means of bolts 13. Although only one bolt is shown, it is obvious that several will be needed, and I prefer eight. Extending from each cylindrical recess 4 within cylinder head 1 are openings 14 and 15 drilled as shown. Opening 15 is capped by plug 16. It is preferred to have this plug in a recess in cylinder head 1 in order that it cannot be broken in operation. Communicating with each opening 14 is a corresponding longitudinal opening 17 in pressure head 12. For each opening 17 there is a radial opening 18 capped by plug 20. Axial opening 19 intersects openings 18. Pressure head 12 also has a threaded recess opening 31 to accommodate swivel coupling 33.

Figure 3:
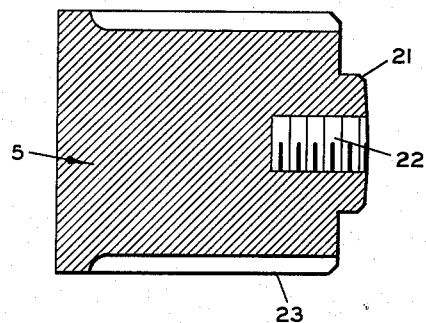
Figure 3 is a sectional elevation view of the piston taken at line 3—3 of Figure 4.
Figure 4:
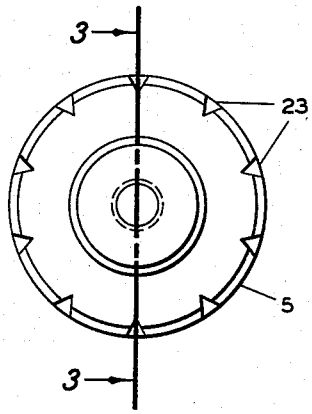
Figure 4 is a plan view of the piston.

With reference to Figures 3 and 4, piston 5 consists of a solid cylinder turned to have a raised portion 21 and a threaded recess 22 at the top and a plurality of longitudinal V-grooves 23 for lubrication purposes. Although I do not wish to be bound by any particular size or number of these lubrication grooves, I prefer a groove not deeper than .06 of the diameter of the piston and an included angle of approximately 60°, however I have found that grooves as shallow as .02 of the diameter, and as deep as .12 of the diameter will prove very satisfactory.

The same numbers are used in different figures of the drawing to indicate identical objects. Although I have described only one piston, whereas there may be more than one, and I prefer four, each piston and its associated parts are identical and the fluid openings to each piston recess are also identical and converge into a common point at the beginning of opening 19.

In assembling my hydraulic torque indicator, cylinder head 1 is placed in a suitable position. Piston spring 24 and piston cup 25 are then placed in the cylindrical recess 4. Piston 5 is then placed within this recess. Since the contact between the piston and the cylindrical recess is very small, it will be desirable to use a suitable tool which is threaded to accommodate threaded opening 22 in the piston so that the piston may be easily inserted or removed from the recess 4. It is preferred that the grooves 23 be filled with a suitable lubricant, although it is not necessary, as will be explained later. Driver assembly 6, complete with packings 10 and 11, is then slipped over cylinder head 1, as shown in Figure 2. Next, pressure head 12 is slipped onto cylinder head 1. Lip 26 is provided in pressure head 12 so that it may be centered in recess 27 on cylinder head 1. Suitable gaskets 28 are placed between each opening 14 and 17. The entire assembly is then rigidly connected by means of bolts 13, which pass through pressure head 12 and are screwed into cylinder head 1 by threads 29 and are fastened at the top of pressure head 12 by nut 30. The tightening of these bolts firmly compresses packings 10, 11 and 28, thereby preventing the escape of the hydraulic fluid or the cylinder lubricant. A suitable hydraulic fluid is poured into threaded opening 31, which completely fills openings 19, 18, 17, 14, 15 and the portion of cylindrical recess 4 between the piston cup 25 and the bottom of the recessed opening designated as 32. It is obvious that plugs 20 and 16 may be opened during the filling of the fluid system, in order that all air may be removed from the fluid system. Plug 16 also serves as a drain opening when the indicator is to be dismantled. Any conventional hydraulic swivel coupling 33 which will allow the pressure gage 34 to remain stationary as pressure head 12 rotates may be used. This swivel coupling 33 is screwed into threaded opening 31 in pressure head 12. Any suitable pipe 35 may be used to connect swivel coupling 33 and pressure gage 34 and may be any desired length or shape to place pressure gage 34 where it may be conveniently read. In order that there will be no air in pipe 35, it may be desirable to include a valve (not shown) so that the pressure gage and pipe 35 may be completely filled with hydraulic fluid and then placed into position.

The assembled torque indicator is slipped onto shaft 3 and fastened thereto by any suitable means such as a key 36. Recess 37 within pressure head 12 may be of any convenient size so as to allow shaft 3 to extend thereinto, as shown in Figure 2. Alemite grease fitting 38, which may be placed anywhere in driver assembly 6, is used to partially or completely fill the openings between cylinder head 1 and driver assembly 6. This grease will of course find its way to the grooves 23 shown on piston 5.

Although I have shown driver assembly 6 as having a sprocket, it is obvious that this may be a pulley, gear or any other suitable driving means.

Having thus assembled the torque indicator, it is obvious that driver assembly 6 may be rotated by any suitable driving means, such as a gasoline or diesel engine, steam turbine, or electric motor. When power is applied to driver assembly 6 it tends to rotate and flat surface 39 contacts elevated portion 21 of piston 5, which in turn will tend to move piston 5 into the cylindrical recess 4. The movement of this piston 5 will be resisted by the fluid in opening 32 and of course the entire hydraulic system as explained above. Since the hydraulic fluid is more or less incompressible, this movement will stop and the turning of the driver assembly 6 will rotate cylinder head 1, thereby rotating shaft 3 which is to be driven. It is obvious that since the diameter of the piston, the number of the pistons and the location of the pistons from the center of the shaft are known, the pressure in the hydraulic fluid system, which is indicated by pressure gage 34, in a function of the torque being applied to the shaft. Although I have shown a pressure gage, any suitable pressure indicating or recording instrument may be used.

While I have not shown the details of a drilling rig, it is obvious to those skilled in the art that shaft 3 will be the shaft that drives the rotary table. The accompanying drawing is diagrammatic and not drawn to scale.

It is to be understood that this invention should not be unnecessarily limited to the above drawing and discussion and that modifications and variations may be made without departing from the invention or from the scope of the claims.

I claim:

1. A hydraulic torque indicator, adapted to operatively connect a drive means and a drive shaft for a rotary table of a rotary drilling rig, comprising in combination a cylindrical cylinder head rigidly mounted on said drive shaft, one end portion of said cylinder head being notched so as to form a modified cross and the other end being provided with an outwardly turned flange; a cylinder of given size extending a given distance into each arm formed by said notched cylinder head portion from the same rotational direction and a given distance from the rotational axis of said cylinder head; first fluid conduits extending from the inner end portion of said cylinders through the end wall of the notched portion of said cylinder head; a resilient piston cup in each cylinder; a piston, having lubricant recesses in its peripheral surface and extending along a major portion of its length, in each said cylinder and fitting closely against the side wall of said cylinder throughout a major portion of the length of the piston within said cylinder, the inner end of said piston fitting against the outer side of said piston cup across the entire cross-section of said cylinder, and a portion of each said piston extending from each said cylinder a distance equal to the extension of each of the other pistons; a driver closely but slidably fitted to the periphery of said cylindrical cylinder head, abutting at one end against said outwardly turned flange, extending to the end of the notched section of said cylinder head, and at least a portion of the inner periphery of said driver extending into the notched portion of said cylinder head so as to press in the direction of rotation against the extended end portion of each said piston; a pressure head rigidly affixed to the notched end of said cylinder head and extending outwardly so as to slidably retain said driver between it and said outwardly turned flange of said cylinder head; second fluid conduits extending through said pressure head from said first fluid conduits in said cylinder head to a common conduit in said pressure head; a pressure indicator closing said common conduit; and hydraulic fluid filling said common conduit, second fluid conduits, first fluid conduits, and said cylinders downstream of said piston cup.

2. The hydraulic torque indicator of claim 1, wherein a spring member is provided in each said cylinder extending between the inner end of said cylinder and said piston cup therein so as to maintain said cylinder and said piston cup in spaced-apart relation.

3. The hydraulic torque indicator of claim 2, wherein drain conduits extend between the inner end portion of said cylinders and the exterior of said cylinder head; and closure means in each said drain conduit.

4. The hydraulic torque indicator of claim 3, wherein packing means are provided between said driver and said outwardly turned flange of said cylinder head and between said driver and the outwardly extending portion of said pressure head.

5. The hydraulic torque indicator of claim 1, wherein said pressure indicator is attached to said common conduit by means of a swivel coupling.

6. The hydraulic torque indicator of claim 1, wherein said lubricant recesses in said piston are spaced about the periphery of said piston and are V-shaped grooves having a depth between .02 and .12 of the diameter of said piston.

7. The hydraulic torque indicator of claim 1, wherein lubricant inlet means extend through said driver to its inner periphery adjacent said cylinder head.

8. A hydraulic torque indicator, adapted to operatively connect a drive means and a drive shaft for a rotary table of a rotary drilling rig, comprising in combination a cylindrical cylinder head rigidly mounted on said drive shaft, one end portion of said cylinder head being notched so as to form a modified cross and the other end being provided with an outwardly turned flange; a cylinder of given size in at least one arm of said cylinder head extending a given distance therein perpendicular to the radius of said cylinder head at a set distance from the rotational axis of said cylinder head; a first fluid conduit extending from the inner end portion of each said cylinder through the end wall of the notched portion of said cylinder head; a resilient piston cup in each cylinder; a piston, having lubricant recesses in its peripheral surface and extending along a major portion of its length, in each said cylinder and fitting closely against the side wall of said cylinder opening throughout a major portion of the length of the piston within said cylinder, the inner end of said piston fitting against the outer side of said piston cup across the entire cross-section of said cylinder opening, and a portion of each piston extending from each said cylinder a distance equal to the extension of any other piston; a driver closely but slidably fitted to the periphery of said cylindrical head, fitted at one end against said outwardly turned flange, extending to the end of the notched section of said cylinder head, and at least a portion of the inner periphery of said driver extending into the notched portion of said cylinder head so as to contact the extended end portion of each said piston; a pressure head rigidly affixed to the notched end of said cylinder head and extending outwardly so as to slidably retain said driver between it and said outwardly turned flange of said cylinder head; a second fluid conduit extending through said pressure head from each said first fluid conduit in said cylinder head to a common conduit in said pressure head; a pressure indicator closing said common conduit; and hydraulic fluid filling said common conduit, each said second fluid conduit, each said first fluid conduit, and each said cylinder downstream of said piston cup.

FREDERICK B. BAYLESS.

REFERENCES CITED

The following references are of record in the file of this patent:

UNITED STATES PATENTS

| Number | Name | Date |
|---|---|---|
| 195,837 | Nagle | Oct. 2, 1877 |
| 288,728 | Orton | Nov. 20, 1883 |
| 517,439 | Cross | Apr. 3, 1894 |
| 1,685,297 | Shone | Sept. 25, 1928 |